(12) United States Patent
Manroa et al.

(10) Patent No.: US 10,097,587 B2
(45) Date of Patent: Oct. 9, 2018

(54) COMMUNICATION MANAGEMENT AND POLICY-BASED DATA ROUTING

(71) Applicant: TIME WARNER ENTERPRISES LLC, New York, NY (US)

(72) Inventors: Arun Manroa, Herndon, VA (US); Qiang Zhang, Fairfax, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

(21) Appl. No.: 15/351,948

(22) Filed: Nov. 15, 2016

(65) Prior Publication Data

US 2017/0063934 A1    Mar. 2, 2017

Related U.S. Application Data

(63) Continuation of application No. 14/445,605, filed on Jul. 29, 2014, now Pat. No. 9,537,868.

(51) Int. Cl.
| | |
|---|---|
| *H04L 29/06* | (2006.01) |
| *H04W 12/06* | (2009.01) |
| *H04W 48/16* | (2009.01) |
| *H04L 12/24* | (2006.01) |
| *H04W 12/08* | (2009.01) |
| *H04W 88/08* | (2009.01) |

(52) U.S. Cl.
CPC ......... *H04L 63/20* (2013.01); *H04L 41/0893* (2013.01); *H04L 63/08* (2013.01); *H04L 63/10* (2013.01); *H04W 12/06* (2013.01); *H04W 12/08* (2013.01); *H04W 48/16* (2013.01); *H04W 88/08* (2013.01)

(58) Field of Classification Search
CPC ..... H04L 63/20; H04L 63/08; H04L 63/0892; H04L 63/10; H04L 63/105; H04L 41/0893; H04W 12/06; H04W 12/08; H04W 48/16; H04W 88/08
See application file for complete search history.

(56) References Cited

U.S. PATENT DOCUMENTS

| | | |
|---|---|---|
| 7,230,951 B2 | 6/2007 | Mizell |
| 8,402,267 B1 | 3/2013 | Graham |
| 8,832,777 B2 * | 9/2014 | Raleigh ................. H04W 24/10 455/406 |
| 2003/0005290 A1 | 1/2003 | Fishman |
| 2004/0208153 A1 | 10/2004 | Mizell |

(Continued)

*Primary Examiner* — Sarah Su
(74) *Attorney, Agent, or Firm* — Armis IP Law, LLC

(57) ABSTRACT

A network environment includes a wireless access point providing access to a corresponding network. One or more mobile communication devices communicate with the wireless access point to access the network. In response to receiving a request from a mobile communication device to establish the wireless communication link, the wireless access point conveys communications between the mobile communication device and a remote server to authenticate the mobile communication device. During authentication, the wireless access point receives a policy assigned to the mobile communication device. The policy specifies how to route subsequent received data traffic from the mobile communication device. Subsequent to authentication, the wireless access point routes the subsequent data traffic received from the mobile communication device in accordance with the received policy.

21 Claims, 10 Drawing Sheets

(56) References Cited

U.S. PATENT DOCUMENTS

| | | |
|---|---|---|
| 2006/0190984 A1 | 8/2006 | Heard |
| 2006/0274665 A1 | 12/2006 | Hatori |
| 2007/0147318 A1 | 6/2007 | Ross |
| 2009/0150970 A1 | 6/2009 | Hinds |
| 2009/0305701 A1 | 12/2009 | Giaretta |
| 2010/0146599 A1 | 6/2010 | Padmanabha |
| 2010/0226347 A1* | 9/2010 | Caldwell ............ H04L 63/0876 370/338 |
| 2011/0040626 A1 | 2/2011 | Lin |
| 2011/0078287 A1 | 3/2011 | Pacella |
| 2012/0017253 A1* | 1/2012 | Hicks, III .......... H04N 21/4122 725/114 |
| 2012/0110329 A1 | 5/2012 | Brown |
| 2012/0166618 A1 | 6/2012 | Dahod |
| 2012/0240204 A1* | 9/2012 | Bhatnagar ............... G06F 21/35 726/5 |
| 2012/0243478 A1* | 9/2012 | Nielsen ............... H04L 63/0884 370/328 |
| 2012/0324100 A1 | 12/2012 | Tomici |
| 2013/0046976 A1 | 2/2013 | Rosati |
| 2013/0230036 A1 | 9/2013 | Reznik |
| 2014/0185524 A1 | 7/2014 | Kekkii |
| 2014/0204758 A1 | 7/2014 | Zhu |
| 2014/0298420 A1 | 10/2014 | Barton |
| 2014/0337528 A1 | 11/2014 | Barton |
| 2015/0121482 A1* | 4/2015 | Berman ................. H04L 63/10 726/5 |
| 2015/0188810 A1 | 7/2015 | Salkintzis |
| 2016/0065481 A1* | 3/2016 | Zhang ................ H04L 41/0893 370/230 |
| 2017/0019427 A1* | 1/2017 | Vank ....................... H04L 63/08 |

\* cited by examiner

| SUBSCRIBER USER | ACCOUNT INFORMATION | SUBSCRIBER CREDENTIALS | MOBILE COMMN. DEVICE | ASSIGNED POLICY |
|---|---|---|---|---|
| 108-1 | 15523456-12 | 330-1 | 120-1 | 110-1 |
| 108-2 | 15522677-17 | 330-2 | 120-2 | 110-2 |
| 108-3 | 15443456-12 | 330-3 | 120-3 | 110-3 |
| 108-4 | 36773566-14 | 330-4 | 120-4 | 110-4 |
| ... | ... | ... | ... | ... |

SUBSCRIBER INFO. 177

FIG. 3

| SUBSCRIBER USER | MOBILE COMMN. DEVICE | DEVICE NETWORK ADDRESS | ASSIGNED POLICY |
|---|---|---|---|
| 108-1 | 120-1 | ABCD | 110-1 |
| 108-2 | 120-2 | ABBB | 110-2 |
| ... | ... | ... | ... |

MAP INFO. 175

FIG. 5

COMMUNICATION MANAGEMENT AND POLICY-BASED DATA ROUTING

RELATED APPLICATIONS

This application is a continuation of earlier filed U.S. patent application Ser. No. 14/445,605 entitled "COMMUNICATION MANAGEMENT AND POLICY-BASED DATA ROUTING," filed on Jul. 29, 2014, the entire teachings of which are incorporated herein by this reference.

BACKGROUND

Conventional computer devices typically have the ability to identify a presence of WiFi™ access points. For example, according to current technology, to learn of one or more access points in a region, a computer device can transmit a wireless query signal (e.g., a probe request). In response to the wireless query signal, any of one or more active WiFi™ network access points in the region will respond with information indicating their identities (a.k.a., SSIDs). In certain instances, a respective SSID is a human-readable network name assigned to a respective network. Accordingly, via the response information from the access points, the operator of the computer can identify which, if any, WiFi™ networks are available for use in the region.

After identifying available WiFi™ networks, the computer device can initiate display of the identities of the different WiFi™ networks on a display screen. In such an instance, the user of the computer can manually select from a listing of the available WiFi™ networks (SSIDs) to connect. According to conventional techniques, since each SSID (network name) corresponds to a different available for network, the respective user is able to connect to any of multiple networks depending upon the chosen SSID (network name).

If the WiFi™ access point is an open WiFi™ network, the user will not need to provide a password to be granted access to the Internet through the selected WiFi™ access point. Alternatively, in certain instances, such as in secured WiFi™ networks, the user may be required to provide appropriate credentials (such as username, password, etc.) to use the wireless access point if restrictions have been imposed on use of the wireless access point.

If used, a downside of open networks is that illegitimate users (a.k.a., hackers) can potentially eavesdrop on respective wireless communications between a computer device and a respective WiFi™ access point. Via eavesdropping, an illegitimate user may be able to learn of a respective network address associated with the computer device. Using the network address, the illegitimate user may be able to control use of the communication link or steal data. Thus, unsecured wireless communications (such as WiFi™ communications) are undesirable.

To alleviate and/or prevent hacking of wireless communications, several wireless communication protocols have been established for use in WiFi™ applications to provide more secured wireless communications. For example, the EAP (Extensible Authentication Protocol) is a desired protocol for use in wireless network applications. The EAP protocol expands on authentication methods used by the Point-to-Point Protocol (PPP), a protocol often used when connecting a computer to the Internet.

In general, to communicate in accordance with EAP, assume that a user requests to establish a connection with a respective wireless access point. The wireless access point requests that the user (or corresponding mobile communication device) of the communication device provide identification information. The wireless access point forwards the identification information received from the user to an authentication server. The authentication server challenges the user of the communication device to provide proof of the validity of the provided identification information. The wireless access point receives and forwards authentication information (such as password, etc.) received from the user to the authentication server. If the authentication information is correct for the corresponding identity of the communication device, the authentication server notifies the wireless access point to allow the user of the communication device access to the Internet through the wireless access point.

BRIEF DESCRIPTION OF EMBODIMENTS

Use of conventional wireless networks suffer from a number of deficiencies. For example, an access point can be configured to provide notification of its presence and availability to multiple mobile communication devices. As previously discussed, the access point can be communicatively coupled to a respective network. During operation, subsequent to being authenticated, the access point receives wireless communications from the multiple mobile communication devices and forwards corresponding data packets on behalf of multiple mobile communication devices over a respective network to one or more specified destinations. In a reverse direction, the access point receives communications from resources in the respective network and forwards the communications over the wireless links to the appropriate communication devices.

Embodiments herein deviate with respect to conventional techniques of providing network access to multiple communication devices.

For example, in one embodiment, a network environment includes message-processing hardware. The message processing hardware or connection manager can be disposed in any suitable location. In one embodiment, the message processing hardware is located in a wireless access point providing network access to multiple mobile communication devices.

The message processing hardware provides notification (such as via broadcast of an SSID assigned to the access point) of availability of the wireless access point and corresponding network access to the multiple mobile communication devices. For example, in one embodiment, the message processing hardware initiates transmission of a notification message from the wireless access point to the mobile communication devices indicating availability of the wireless access point to the multiple mobile communication devices.

Assume that the mobile communication devices requests network access. In response to receiving access requests from the multiple mobile communication devices, the wireless access point establishes connectivity between the wireless access points and each of the multiple mobile communication devices.

In one embodiment, each of the mobile communication devices must be authenticated before the respective mobile communication device is provided network access. Authentication can include conveying communications between each respective mobile communication device and a remote server to authenticate the respective mobile communication device.

In a more specific embodiment, during authentication, the message processing hardware receives and forwards an identity of the mobile communication device to the remote authentication server; the message processing hardware receives and forwards a challenge (requesting credentials from the user of the mobile communication device) from the remote server to the mobile communication device; the message processing hardware receives and forwards a challenge response (such as credentials provided by the user of the mobile communication device) from the mobile communication device to the remote server; and the message processing hardware receives an acknowledgment from the authentication server indicating that the authentication server verified that the challenge response received from the mobile communication device is correct and that the respective mobile communication device has been authenticated and is authorized to use a respective network.

In a similar manner, the message processing hardware can be configured to authenticate each of multiple mobile communication devices. By way of non-limiting example embodiment, the message processing hardware can be configured to initiate authentication of the mobile communication devices in accordance with EAP (Extensible Authentication Protocol) or other suitable wireless protocol supporting secured communications.

In one embodiment, in addition to receiving a respective acknowledgment from the authentication server for each authenticated mobile communication device, the message processing hardware receives a respective routing policy for the respective authenticated mobile communication device. The message processing hardware can receive the policy as part of an authentication access response (from the authentication server or other suitable resource) indicating to provide the mobile communication device network access. The respective routing policy specifies how to route subsequent received wireless data traffic from the respective mobile communication device that has just been authenticated.

In accordance with further embodiments, the wireless access point is communicatively coupled to multiple different networks. The respective routing policy specifies which of the multiple different networks the respective mobile communication device is to be connected or provided access. In other words, in accordance with the multiple policies, the wireless access point routes data traffic received from the mobile communication devices over the multiple different networks.

Subsequent to receiving a respective policy for a mobile communication device, the message processing hardware produces a respective map associating a network address of the mobile communication device with the received policy. When routing the subsequent data traffic for the mobile communication device, the message processing hardware detects presence of a network address specifying a source address the mobile communication device transmitting the communication. The message processing hardware maps the source network address to the appropriate policy assigned to the mobile communication device transmitting the communication. Recall that policy assigned to the mobile communication device indicates to transmit the subsequent data traffic from the mobile communication device to a particular network amongst multiple networks. In accordance with the policy, the message processing hardware transmits the subsequent data traffic over a particular network as specified by the policy assigned to the sender.

As a more specific example of routing communications, subsequent to authentication and receiving respective routing policies, assume that the wireless access point receives communications from a first mobile communication device that has been authorized to use the wireless access point. The wireless access point maps the communications from the first mobile communication device to a first policy that is assigned to the first mobile communication device. In accordance with routing information as specified by the first policy assigned to the first mobile communication device, the wireless access point transmits data traffic received from the first mobile communication device over a first network of the multiple different networks.

Assume that the wireless access point receives communications from a second mobile communication device that has been authorized to use the wireless access point. The wireless access point maps the communications from the first mobile communication device to a second policy that is assigned to the second mobile communication device. In accordance with routing information as specified by a second policy assigned to the second mobile communication device, the wireless access point transmits data traffic received from the second mobile communication device over a second network of the multiple different networks.

In addition to, or in lieu of, routing data traffic depending upon the source network address of the mobile communication device, embodiments herein can include selectively routing received data traffic depending at least in part upon the destination address of an intended recipient resource.

For example, the message processing hardware can be configured to receive a wireless communication from the mobile communication device. The message processing hardware can be configured to process the received wireless communication to identify a destination address indicating an intended recipient of the received wireless communication. As previously discussed, the message processing hardware maps a source network address in the received wireless communication to a corresponding policy assigned to the mobile communication device sending the wireless communication. The corresponding policy can specify which of the multiple different networks to forward the communication depending upon the destination address in the received wireless communication. The corresponding policy may indicate to forward received communications having a first specified destination address over a first network and forward received communications having a second specified destination address over a second network. In such an instance, the message processing hardware processes the received policy assigned to the sender mobile communication device to identify which of multiple networks to forward data in the received wireless communication to the intended recipient.

In accordance with a specific embodiment, when a communication device attaches to a respective wireless access point using HS2.0/Passpoint SSID, an authentication control signaling is established between the device and AAA backend enroute via the WiFi AccessPoint/Controller. After the communication device is authenticated, the AAA system consults a provisioning database for the user, based on business rule sets, the AAA system will determine whether the user's data shall be tunneled to the WiFi core network or shall local-breakout to internet directly at the access point. The returned RADIUS AVP from AAA to the Access Point/Controller will carry the policy AVP (Attribute Value Pair) or VSA (Vendor Specific Attribute) that indicates the on/off the local breakout or tunnel for the upcoming data plane from the just authenticated device. The Access Point/Controller will route the traffic based on the communicated policy Embodiments herein are useful over conventional techniques. For example, even though the wireless access point is advertised to multiple mobile communication devices as being a single wireless access point, the wireless access point provides connectivity to multiple different networks. This reduces the need to install multiple different access points in a respective geographical location. In other words, in contrast to conventional techniques, a single wireless access point (rather than to wireless access points) provides multiple different types of users access (and corresponding mobile communication devices) to different types of networks.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment as described herein includes a computer readable storage medium, system, hardware, etc., having instructions stored thereon. The instructions, when executed by computer processor hardware, cause the computer processor hardware of the system to: convey communications between a mobile communication device and a remote server to authenticate the mobile communication device; receive a policy specifying how to route subsequent data traffic from the mobile communication device; and route the subsequent data traffic received from the mobile communication device in accordance with the received policy.

Another embodiment as described herein includes computer readable storage medium, system, hardware, etc., having instructions stored thereon. The instructions, when executed by computer processor hardware, cause the computer processor hardware of the system to: provide notification of availability of a wireless access point to multiple mobile communication devices; establish connectivity between the wireless access points and each of the multiple mobile communication devices; obtaining multiple policies, the multiple policies specifying how to route wireless data traffic from the mobile communication devices; and in accordance with the multiple policies, route data traffic received from the mobile communication devices.

Note that the ordering of the operations can vary. For example, any of the processing operations as discussed herein can be performed in any suitable order.

Other embodiments of the present disclosure include software programs and/or respective hardware to perform any of the method embodiment operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for implementing a message-processing resource to selectively provide network access to multiple networks. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 3 is an example diagram illustrating subscriber information according to embodiments herein.

FIG. 5 is an example diagram illustrating mapping information according to embodiments herein.

Figure 1:
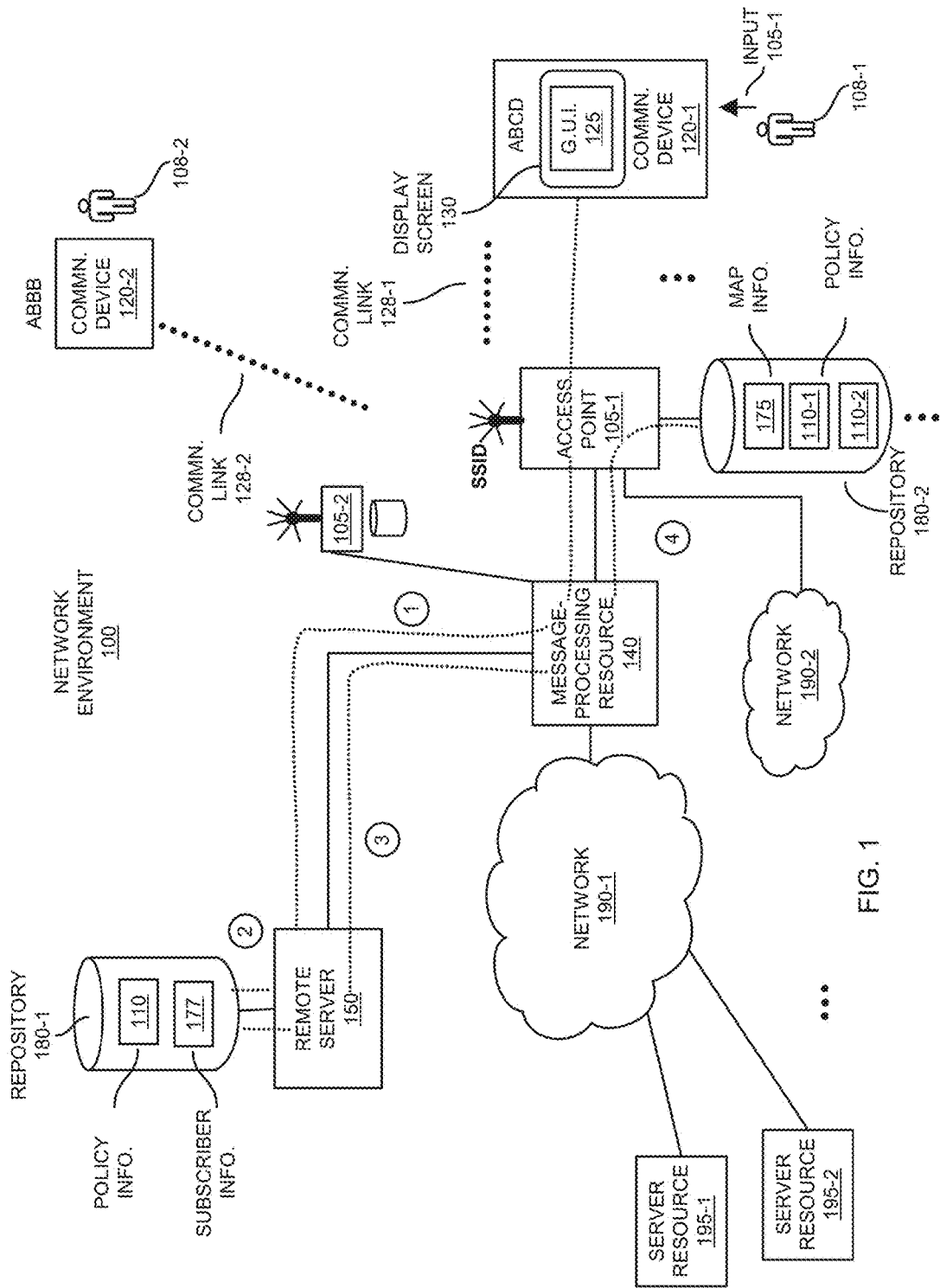
FIG. 1 is an example diagram illustrating a network environment and distribution of configuration information (such as one or more policies) controlling data flow according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In accordance with one embodiment, a network environment includes one or more wireless access points providing network access. One or more mobile communication devices communicate through the wireless access points to access the networks. In response to receiving a request from a mobile communication device to establish a wireless communication link and access a network, the wireless access point conveys communications between the mobile communication device and a remote server to authenticate the mobile communication device. By way of non-limiting example, during authentication, the wireless access point receives a policy assigned to the mobile communication device. The policy specifies how to route subsequent received data traffic from the mobile communication device. Subsequent to authentication, the wireless access point routes the subsequent data traffic received from the mobile communication device in accordance with the received policy.

Certain embodiments as discussed herein provide a method to dynamically assign and enforce an offloading policy to a wireless access point when a respective communication device attaches and authenticates on Carrier WiFi's Hotspot 2.0 (Passpoint) SSID. The operator of the wireless access point can therefore apply different SLAs (Service Level Agreement) on same SSID for different users based on complicated backend product catalogue as well as plan provisioning.

Now, more specifically, FIG. 1 is an example diagram illustrating a network environment and corresponding resources supporting data traffic flow control according to embodiments herein. Note that each of the resources such as the message-processing resource 140, mobile communication device 120-1, mobile communication device 120-2, remote server 150, wireless access point 105-1, etc., represents or includes hardware, software, or a combination of hardware and software to carry out functionality as discussed herein.

As shown, network environment 100 includes mobile communication device 120-1, mobile communication device 120-2, etc. Thus, mobile communication device 120-1 can be one of multiple mobile communication devices operating in network environment 100. In this example embodiment, user 108-1 operates communication device 120-1; user 108-2 operates communication device 120-2; etc.

Figure 2:
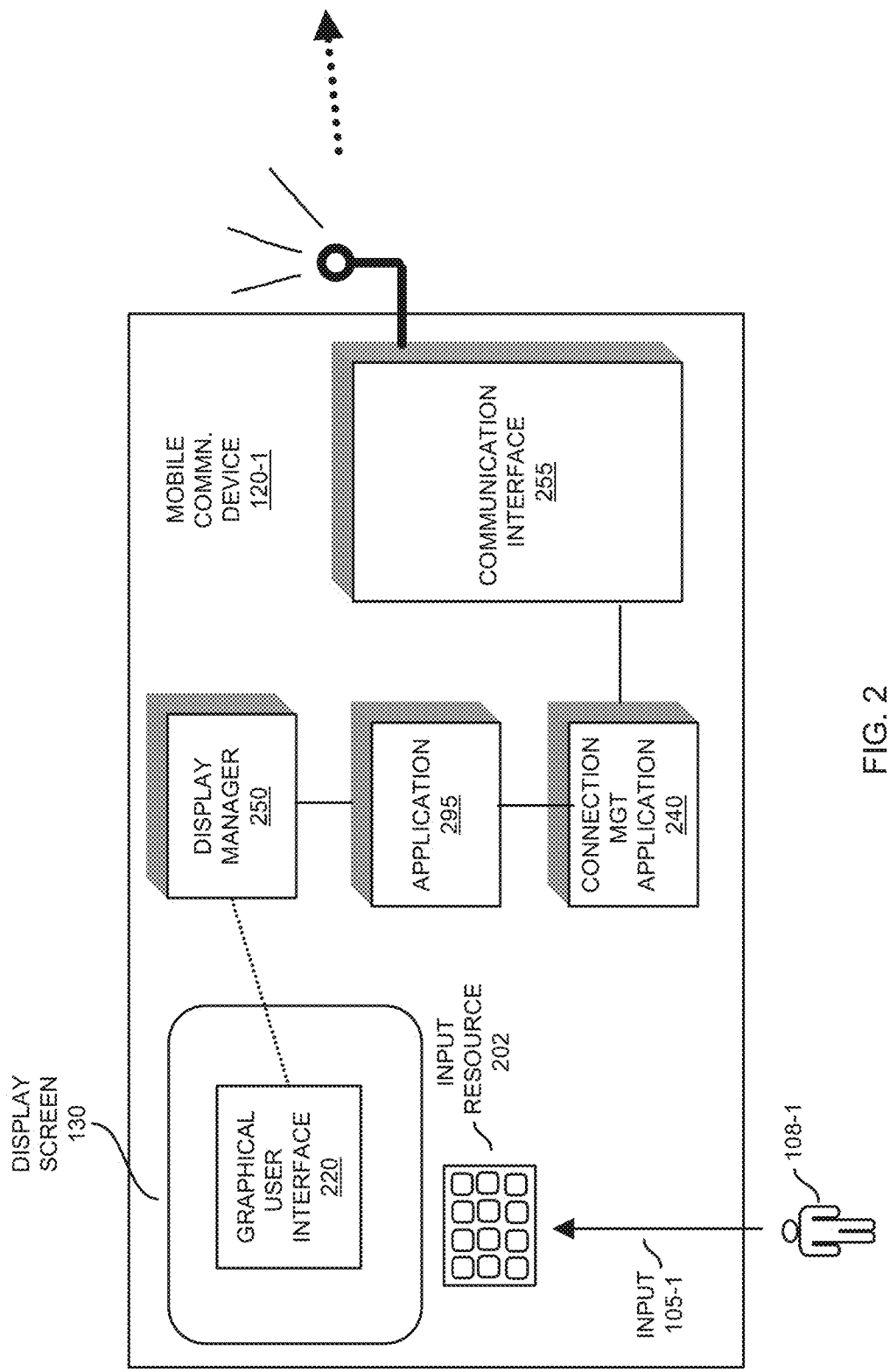
FIG. 2 is an example diagram illustrating a mobile communication device according to embodiments herein.

FIG. 2 is an example block diagram illustrating functionality associated with a respective mobile communication device according to embodiments herein. Note that mobile communication device 120-1 can include any suitable hardware and software resources to carry out operations as discussed herein.

More specifically, as shown in this example embodiment, mobile communication device 120-1 includes display screen 130, connection management application 240, display manager 250, application 295 (such as a browser application), communication interface 255, etc. Each mobile communication device in network environment 100 can operate in a similar manner and include similar resources, interfaces, applications, etc., as mobile communication device 120-1.

Via input 105-1 to input resource 202 (such as a keyboard, touchscreen, mouse, etc.), assume that the user 108-1 initiates execution of application 295 such as a browser application. In one embodiment, subsequent to execution, the application 295 communicates with connection management application 240 to establish a respective wireless connection with a corresponding access point in network environment 100.

In response to receiving a command from application 295 to establish a network connection, the connection management application 240 (via communication interface 255) attempts to establish a respective wireless communication link with a wireless access point associated in network environment 100. As previously discussed, this can include generating and transmitting a corresponding discovery request 125 (such as from communication interface 255) to any listening access points 105 in network environment 100. The connection management application 240 selects amongst the responding one or more access points to establish a corresponding wireless communication link.

Subsequent to establishing a respective wireless communication link, the application 295 is able to communicate through a respective access point and access network 190-2.

As shown, via display manager 250 in mobile communication device 120-1, the application 295 initiates display of corresponding graphical user interface 220 on display screen 130 of mobile communication device 120-1. Graphical user interface 220 on display screen 130 enables the respective user 108-1 to view information retrieved from server resources in network environment 100.

Referring again to FIG. 1, as further shown, user 108-1 provides input 105-1 to operate mobile communication device 120-1. Via input 105-1, and assuming that the access control resource 140 grants the user 108-1 network access, the user 108-1 can perform different operations such as establish a wireless communication link 128-1 with a respective access point 105-1 (or other wireless access points) and communicate through the access point 105-1 with one or more networks such as network 190-1, 190-2, etc. In one embodiment, network 190-2 is a local Internet, local area network, etc. Network 190-1 can be a remote network such as the Internet or other suitable network.

As further discussed below, access to respective networks 190 depends upon a policy assigned to a respective communication device and/or corresponding user.

Note that each of the mobile communication devices 120 can be any suitable type of computer device. For example, a respective mobile communication device can be a cell phone, mobile computer, mobile phone device, digital assistant, a laptop computer, a personal computer, a notebook computer, a netbook computer, a handheld computer, a workstation, etc.

Each mobile communication device is equipped to communicate in a wireless manner with an available access point. In one non-limiting example embodiment, each of one or more wireless access points and corresponding mobile communication devices 120 in network environment 100 supports WiFi™ communications or other suitable wireless or wired protocol.

Message processing hardware 140 (such as a wireless access point controller) and remote server 150 control whether any of one or more respective access points in network environment 100 is authorized to provide network connectivity to respective requesting users 108.

In one embodiment, message-processing resource 140 is a gateway resource controlling access to networks 190. The wireless access point 105-1 is communicatively coupled (such as via a hardwired or wireless communication link) to message-processing resource 140. As previously discussed, wireless access points support wireless communications with respective communication devices 120 via any suitable protocol or WiFi™ standards such as IEEE (Institute of Electrical and Electronics Engineers) 802.11a, 802.11b, 802.11g, 802.11n, etc.

In an upstream direction, such as in a direction outbound from the communication device 120-1, when network access is granted, wireless access point 105-1 facilitates forwarding of communications from communication device 120-1 upstream through access point 105-1 to message-processing resource 140. Thereafter, message-processing resource 140 controls forwarding of the respective communications to network 190-1.

In a downstream direction, inbound to the communication device 120-1, the message-processing resource 140 facilitates distribution of communications received from resources in network 190-1 downstream and transmitted to wireless access point 105-1. Wireless access point 105-1 further transmits the received communications to the appropriate communication device (such as communication device 120-1) to which the communications are addressed.

As further discussed herein, as an alternative to forwarding messages to message processing resource 140, wireless access point 105-1 can be configured to bypass forwarding of communications to the message-processing resource 140 and transmit communications over network 190-2. In this manner, the access point 105-1 is able to selectively forward communications (such as in accordance with forwarding rules or policies 110 as further discussed below).

Note that the message processing hardware 140 (such as a WiFi™ controller) can be disposed in any suitable location. In one embodiment, the message processing hardware is located in a wireless access point providing network access to multiple mobile communication devices. In accordance with alternative embodiments, as shown, the message processing hardware 140 is disparately located with respect to corresponding wireless access points 105 in network environment 100. In either case, the message-processing resource 140 can be configured to participate in the control of wireless access points 105 and corresponding wireless connectivity amongst the multiple different mobile communication devices 120.

In accordance with further embodiments, note that networks 190 (network 190-1 and network 190-2) can be or include any suitable type of wired or wireless network resources facilitating communications. In one embodiment, one or more of the networks 190 support client/server communications and delivery of data packets using network addresses assigned to each of the resources.

In one embodiment, each of network 190-1 and network 190-2 is a packet-switched network facilitating distribution of communications (such as one or more data packets) in accordance with any suitable communication protocol. In one embodiment, packet-switched network 190-1 and/or network 190-2 represent the Internet.

In accordance with further embodiments, network environment 100 and corresponding resources therein supports switching of data packets using source and destination address information. For example, the source address of a communication such as a data packet indicates a corresponding resource from which the data packet is generated. A destination address of a communication (data packet) indicates a corresponding address of the resource to which the data packet is being transmitted. The networks 190 use the destination address to route the respective data packets to an identified destination. The recipient (destination) of the communication uses the source addresses to identify a particular client that transmitted the communication.

As further shown, network environment 100 includes message processing resource 140. As its name suggests, the message-processing resource 140 processes messages and controls wireless connectivity of respective mobile communication devices 120 with access points in network environment 100.

In accordance with one embodiment, the user 108-1 must be a respective subscriber to use any of the access points 105. In accordance with further embodiments, the access points in network environment 100 provide different types of connectivity depending upon the user and/or mobile communication device.

Embodiments herein deviate with respect to conventional techniques. For example, embodiments herein include novel ways of managing data traffic flows in respective network environment 100. More specifically, as shown, network environment 100 includes a number of access points 105 (access point 105-1, access point 105-2, . . . ) that potentially provide the mobile communication device 120-1 (and other mobile communication devices in network environment 100) access to respective networks 190.

In this example embodiment, assume that the mobile communication device 120-1 generates a respective discovery request (such as a wireless broadcast message or WiFi™ probe request) in network environment 100 to learn of any access points 105 available to provide the mobile communication device 120-1 network access. Any of the access points 105 within wireless communication range of the mobile communication device 120-1 receives the discovery request generated by the mobile communication device 120-1 and responds with a wireless signal notifying the respective communication device 120-1 of their availability.

In certain instances, to the wireless access points 105 transmits wireless signals in the network environment 100 without receiving a respective discovery request. Such transmitted wireless signals from the wireless access points 105 notify any communication devices 120 of their presence.

In one embodiment, the wireless access point 105-1 provides notification (such as via broadcast of an SSID or Service Set IDentifier assigned to the access point) of availability of the wireless access point and network access to the multiple mobile communication devices 120. For example, in one embodiment, the wireless access point 105-1 (and corresponding message processing hardware therein) initiates transmission of a notification message (such as an SSID) from the wireless access point to the mobile communication devices indicating availability of the wireless access point to the multiple mobile communication devices. In one embodiment, the notification is a human-readable string of bytes representing a corresponding unique network name assigned to the access point 105-1.

In certain instances, a respective SSID indicates a respective service provider that manages the corresponding wireless access point. Assuming that a user is a subscriber, the user may desire to connect to a specific wireless access point provided by the respective service provider.

In this example embodiment, after learning of the availability of wireless access point 105-1, assume that the user 108-1 operating communication device 120-1 would like to connect to one or more network services associated with wireless access point 105-1. In such an instance, the communication device 120-1 sends a message over wireless communication link 128-1 to wireless access point 105-1 to connect to a respective one of multiple networks 190.

In one embodiment, each of the mobile communication devices must be authenticated before the respective mobile communication device is provided network access. Authentication can include conveying communications between a respective mobile communication device 120 and a remote server 150 to authenticate the respective mobile communication device.

By way of non-limiting example embodiment, the remote server 150 can be a so-called AAA server resource supporting services such as authentication, authorization, and accounting. Authentication refers to the process in which an entity's identity is authenticated, typically by providing evidence that it holds a specific digital identity an identifier and the corresponding credentials such as passwords, one-time tokens, digital certificates, digital signatures, etc. The authorization function determines whether a particular entity is authorized to perform a given activity, typically inherited from authentication when logging on to an application or service. Accounting refers to the tracking of network resource consumption by users for the purpose of capacity and trend analysis, cost allocation, billing, etc.

In a more specific embodiment, during authentication such as when the access point 105-1 communicates through wireless access point 105-1 and the message processing resource 140 to remote server 150, the wireless access point 105-1 and message processing hardware 140 receives and forwards an identity of the mobile communication device 120-1 to the remote server. In response to receiving the identity of the mobile communication device and/or user 108-1, the remote server 150 communicates a challenge message in a reverse direction through message-processing resource 140 back to the access point 105-1. The wireless access point 105-1 receives and forwards the challenge message from the remote server 150 to the mobile communication device 120-1. In response to receiving a challenge message, mobile communication device 120-1 produces a challenge response including appropriate credentials indicating that the communication device 120-1 and/or user 108-1 is authorized to use networks 190.

The wireless access point 105-1 and message processing hardware 140 receive and forward the challenge response from the mobile communication device 120-1 to the remote server 150. The remote server 150 then verifies credentials provided by communication device 120-1.

FIG. 3 is an example diagram illustrating subscriber information according to embodiments herein. As shown, subscriber information 177 includes information about each of the different users and/or corresponding mobile communication devices that are authorized to use a wireless access points 105 in network environment 100.

In this example embodiment, user 108-1 (such as a subscriber of network access services) is assigned: account #15523456-12, credentials 330-1, policy 110-1, and user 108-1 operates mobile communication device 120-1 (which is assigned network address ABCD); user 108-2 is assigned: account #15522677-17, credentials 330-2, policy 110-2, and user 108-2 operates mobile communication device 120-2 (which is assigned network address ABBB); user 108-3 is assigned: account #15443456-12, credentials 330-3, policy 110-3, and user 108-3 operates mobile communication device 120-3; and so on.

Figure 4:
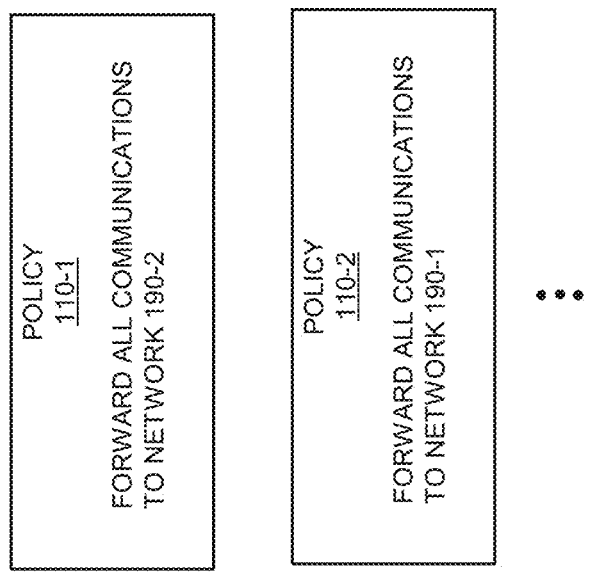
FIG. 4 is an example diagram illustrating policies according to embodiments herein.

FIG. 4 is an example diagram illustrating different policies assigned to the mobile communication devices according to embodiments herein.

As previously discussed, user 108-1 operating mobile communication device 120-1 is assigned policy 110-1; user 108-2 operating mobile communication device 120-2 is assigned policy 110-2; and so on.

As shown, each of the policies 110 includes one or more rules specifying how to manage forwarding of communications from the respective user and/or mobile communication device. For example, in this embodiment, upon providing wireless connectivity of the user 108-1 and/or mobile communication device 120-1, policy 110-1 indicates that all communications received from user 108-1 or mobile communication device 120-1 are to be forwarded by a respective wireless access point over network 190-2. Upon providing wireless connectivity of the user 108-2 and/or mobile communication device 120-2, policy 110-2 indicates that all communications received from user 108-2 or mobile communication device 120-2 are to be forwarded by a respective wireless access point over network 190-1.

Referring again to FIG. 1, repository 180-1 stores policy information 110 as well as corresponding subscriber information 177. Further in this example embodiment, the remote server 150 receives the challenge response provided by the mobile communication device 120-1 and/or user 108-1 (as transmitted through the wireless access point 105-1 and message-processing resource 140) and compares the challenge response to corresponding credentials 330-1 associated with user 108-1 and/or corresponding mobile communication device 120-1.

Assume that the mobile communication device 120-1 produces a challenge response including the appropriate credentials 330-1 associated with the (subscriber) user 108-1. The remote server 150 compares the received credentials from communication device 120-1 to stored credentials 330-1. Assume that the received credentials match credentials 330-1. In such an instance, based at least in part on receipt of appropriate credentials 330-1 from the communication device 120-1, the remote server 150 determines that the mobile communication device 120-1 is authorized to use wireless access point 105-1 to access one or more networks 190. Via communications to the message-processing resource 140, the remote server 150 notifies the wireless access point 105-1 that the user 108-1 and corresponding mobile communication device 120-1 are authorized to wirelessly connect to wireless access point 105-1.

The message processing hardware 140 and wireless access point 105-1 receive an acknowledgment from the remote server 150 (authentication server) indicating that the remote server 150 verified that the challenge response received from the mobile communication device 120-1 is correct and that the respective mobile communication device 120-1 has been authenticated and is authorized to use a respective network.

In a similar manner, the message processing hardware and corresponding resources can be configured to authenticate each of multiple mobile communication devices that would like to access one or more networks 190.

By way of non-limiting example embodiment, the message processing resources (such as wireless access point 105-1, the message-processing resource 140, server resource 150, etc.) can be configured to initiate authentication of the mobile communication devices in accordance with EAP (Extensible Authentication Protocol) or other suitable secured wireless protocol.

In one embodiment, in addition to receiving a respective acknowledgment from the remote server 150 for each authenticated mobile communication device, the wireless access point 105-1 receives a respective routing policy for the respective authenticated mobile communication device. Policy information can be forwarded as supplemental data to the notification that the mobile communication device 120-1 has been authorized to use wireless access point 105-1. In this example, subsequent to executing the mobile communication device 120-1 and corresponding user 108-1, the remote server 150 forwards policy 110-1 assigned to mobile communication device 120-1 and user 108-1 to wireless access point 105-1. Wireless access point 105-1 initiates storage of the policy 110-1 in repository 180-2.

In one embodiment, as previously discussed, the wireless access point 105-1 and/or message processing resource 140 receives the policy 110-1 as part of an authentication access response (from the authentication server or other suitable resource) indicating to provide the mobile communication device network access. The respective routing policy 110-1 specifies how to route subsequent received wireless data traffic (such as data packets received over wireless communication link 128-1) from the respective mobile communication device 120-1.

Recall that the wireless access point 105-1 is communicatively coupled to the multiple different networks 190. In one embodiment, the respective routing policy 110-1 specifies which of the multiple different networks 190 the respective mobile communication device 120-1 is to be connected.

Assume that the user 108-2 operating communication device 120-2 requests network access. In a similar manner as previously discussed, the remote server 150 authenticates the user 108-2 and corresponding communication device 120-2 and forwards corresponding policy 110-2 associated with communication device 120-2 to wireless access point 105-1. Authentication of the user 108-2 and corresponding communication device 120-2 can include receipt of appropriate credentials 330-2 from communication device 120-2. Subsequent to authentication, the remote server 150 forwards the policy 110-2 to wireless access point 105-1. Wireless access point 105-1 receives policy 110-2 and initiates storage of the policy 110-2 in repository 180-2. Wireless access point 105-1 provides the user 108-2 operating communication device 120-2 access to networks 190 in accordance with policy 110-2. In other words, in accordance with the multiple policies 110-1, 110-2, etc., stored in repository 180-2, the wireless access point 105-1 routes data traffic received from the mobile communication devices over the multiple different networks.

Further in this example embodiment, the wireless access point 105-1 produces a map information 175 (as shown in FIG. 5) associating communication devices to corresponding policies. For example, subsequent to receiving policy 110-1 for communication device 120-1 and corresponding user 108-1, the wireless access point 105-1 produces map information 175 to indicate that policy 110-1 specifies how to manage communications associated with mobile communication device 120-1; subsequent to receiving policy 110-2 for communication device 120-2, the wireless access point 105-1 produces map information 175 to indicate that policy 110-2 specifies how to manage communications associated with mobile communication device 120-2; and so on.

In accordance with further embodiments, the wireless access point 105-1 can be configured to associate a respective policy to a network address of the corresponding communication device. For example, in this example embodiment, mobile communication device 120-1 is assigned network address ABCD. In one embodiment, the wireless access point 105-1 learns that the mobile communication device 120-1 is assigned network address ABCD because each of the communications from the mobile communication device 120-1 includes a source address of ABCD. Wireless access point 105-1 (or other suitable resource) produces respective map information 175 associating a network address ABCD of a respective mobile communication device 120-1 and corresponding received policy 110-1.

Additionally, mobile communication device 120-2 is assigned network address ABBB. In one embodiment, the wireless access point 105-1 learns that the mobile communication device 120-2 is assigned network address ABBB because each of the communications from the mobile communication device 120-2 includes a source address of ABBB. Wireless access point 105-1 (or other suitable resource) produces respective map information 175 associating a network address ABBB of a respective mobile communication device 120-2 and corresponding received policy 110-2.

Figure 6:
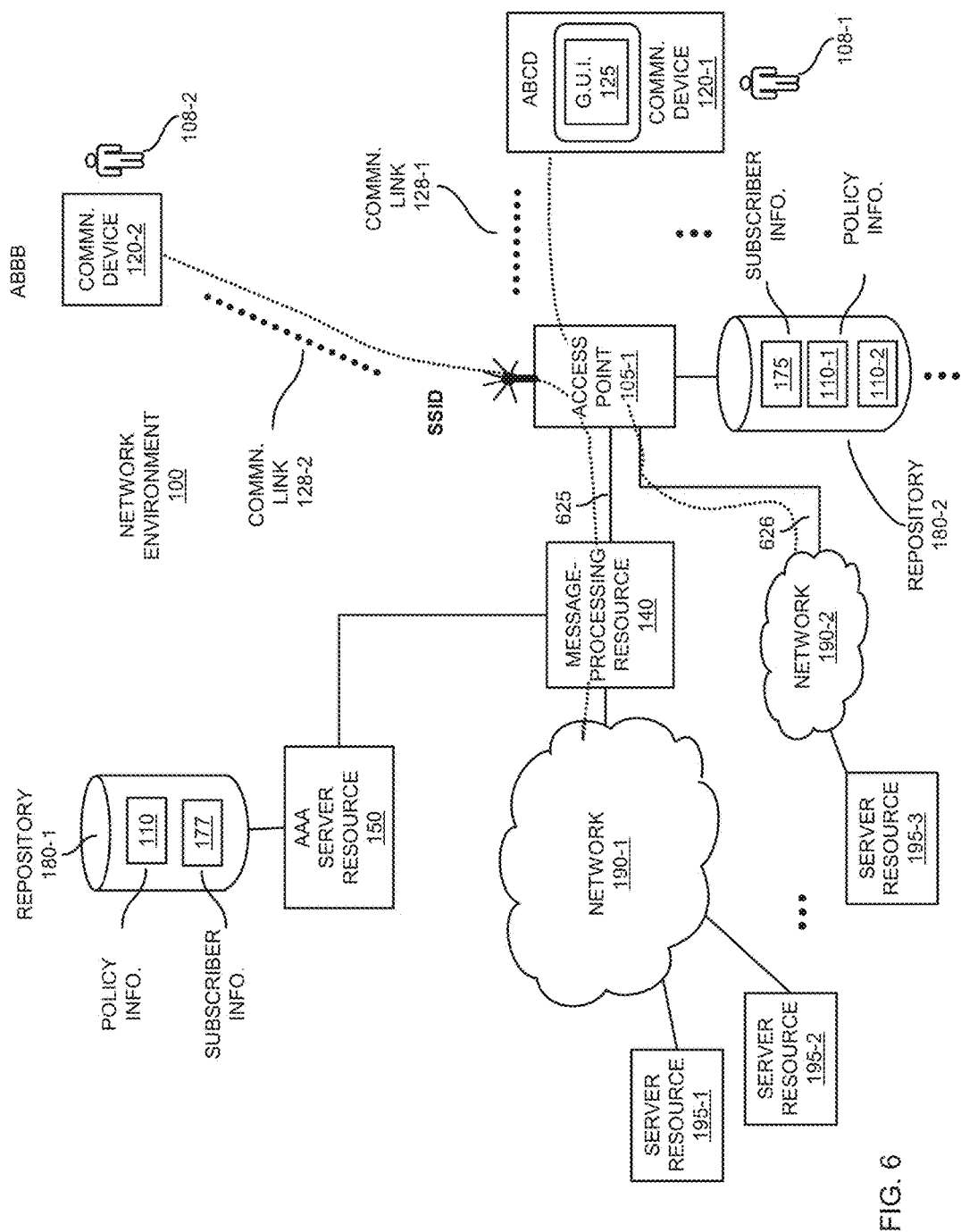
FIG. 6 is an example diagram illustrating a network environment and corresponding control of data through an access point in accordance with one or more policies according to embodiments herein.

FIG. 6 is an example diagram illustrating forwarding of communications according to embodiments herein.

When routing data traffic to an appropriate one of multiple networks 190 as specified by policy information 110 stored in repository 180-2, the message processor or connection manager associated with wireless access point 105-1 detects presence of a network address specifying a source address of the mobile communication device transmitting the communication. The message processor maps the source network address to the appropriate policy in repository 180-2 assigned to the mobile communication device transmitting the communication. Recall that the respective policy assigned to the mobile communication device indicates to transmit the subsequent data traffic from the mobile communication device to a particular network amongst multiple networks. In accordance with the policy, the message processing hardware transmits the subsequent data traffic over a particular network as specified by the policy assigned to the sender communication device.

As a more specific example of routing communications, subsequent to authentication and receiving respective routing policies 110, assume that the wireless access point receives communications (including the source network address ABCD) from a mobile communication device 120-1. The wireless access point 105-1 processes the communications to identify source network address ABCD. Using the source network address ABCD, the wireless 105-1 access point maps the communications received from the first mobile communication device 120-1 to policy 110-1 that is assigned to the first mobile communication device 120-1. Recall that policy 110-1 indicates to forward all communications to network 190-2. In accordance with routing information as specified by the policy 110-1 assigned to the first mobile communication device 120-1, the wireless access point 105-1 transmits data traffic received from the first mobile communication device 120-1 over network 190-2. Transmitting the data traffic received from the first mobile communication device 120-1 over network 190-2 bypasses message-processing resource 140.

In a reverse direction, wireless access point 105-1 receives communications transmitted over network 190-2 destined for communication device 120-1. Wireless access point 105-1 forwards such communications over wireless communication link 128-1 to communication device 120-1.

Further assume that the wireless access point 105-1 receives communications (including the source network address ABBB) from a second mobile communication device 120-2. Using the network address ABBB, the wireless access point 105-1 maps the communications from the mobile communication device 120-2 to policy 110-2 that is assigned to the second mobile communication device 120-2. Recall that policy 110-2 indicates to forward all communications to network 190-1. In accordance with routing information as specified by policy 110-2 assigned to the second mobile communication device 120-2, the wireless access point 105-1 transmits data traffic received from the second mobile communication device 120-2 through message-processing resource 140 over network 190-1. Thus, in this latter instance, the wireless access point 105-1 does not bypass message-processing resource 140.

In a reverse direction, from message-processing resource 140 (network gateway), wireless access point 105-1 receives communications transmitted over network 190-1 destined for communication device 120-2. Wireless access point 105-1 forwards such communications over wireless communication link 128-2 to communication device 120-2.

In this manner, the respective wireless access point 105-1 provides access to different networks 190 depending upon a corresponding policy assigned to the respective user/communication device.

Note that in addition to, or in lieu of, routing data traffic depending upon the source network address of the mobile communication device in a respective assigned policies, embodiments herein can include selectively of routing received data traffic from the mobile communication devices 120 depending at least in part upon the destination address of an intended recipient of the communication.

For example, in one embodiment, the message processing hardware associated with wireless access point 105-1 can be configured to receive a wireless communication from the mobile communication device 120-1. The message processor associated with wireless access point 105-1 can be configured to process the received wireless communication to identify a destination address indicating an intended recipient of the received wireless communication. As previously discussed, the wireless access point maps a source network address in the received wireless communication to a corresponding policy assigned to the mobile communication device sending the received wireless communication. In one embodiment, the corresponding policy associated with a communication device and/or user specifies which of the multiple different networks 190 to forward the corresponding communication depending upon the destination address in the received wireless communication.

As a more specific example, the corresponding policy associated with a particular user 108-1 generating a respective communication may indicate to forward received communications having a first specified destination address (such as communications to server resource 195-1) through message-processing resource 140 over network 190-1 and forward received communications having a second specified destination address (such as communications to server resource 195-3) over a second network 190-2 (bypassing the message-processing resource 140). In such an instance, the wireless access point 105-1 processes the policy assigned to the sender mobile communication device to identify which of multiple networks 190 to forward data in the received wireless communication to the intended recipient.

Embodiments herein are useful over conventional techniques. For example, even though the wireless access point 105-1 is advertised to multiple mobile communication devices 120 as being a single available wireless access point, the wireless access point 105-1 provides connectivity to multiple different networks 190. The policies specifying how to forward data traffic on behalf of the communication devices can be received in any suitable manner such as during authentication of the respective device. The servicing of multiple networks by a single wireless access point reduces the need to install multiple different access points in a respective geographical location. In other words, in accordance with embodiments herein, a single wireless access point such as wireless access point 105-1 provides multiple different types of users access (and corresponding mobile communication devices) to different types of networks.

Note that forwarding of communications over different networks can be achieved in a number of different ways. For example, the wireless access point 105-1 can be physically configured to include multiple physical ports. In such an instance, a first physical port of the wireless access point 105-1 supports transmission of communications over a respective link 625 to message-processing resource 140. The second physical port of the wireless access point 105-1 supports transmission of communications directly to network 190-2 over link 626. During operation, and in accordance with the policy information 110 stored in repository 180-2, the wireless access point 105-1 selects which of the first physical port or the second physical port the wireless access point 105-1 forwards received communications to corresponding destinations.

In accordance with further embodiments, the communication link (such as link 625) between the first physical port of the wireless access point 105-1 and the message processing resource 140 supports tunneled routing in which messages are encapsulated and/or encrypted prior to transmission from the wireless access point 105-1 to message-processing resource 140. Message processing resource 140 (gateway resource) can be configured to decrypt and remove any of one or more encapsulation layers prior to further conveying corresponding data traffic from a communication device (such as from communication device 120-2) to the appropriate destination in network 190-1. In one embodiment, link 626 (such as a bypass path) does not support tunneled routing of data packets.

Figure 7:
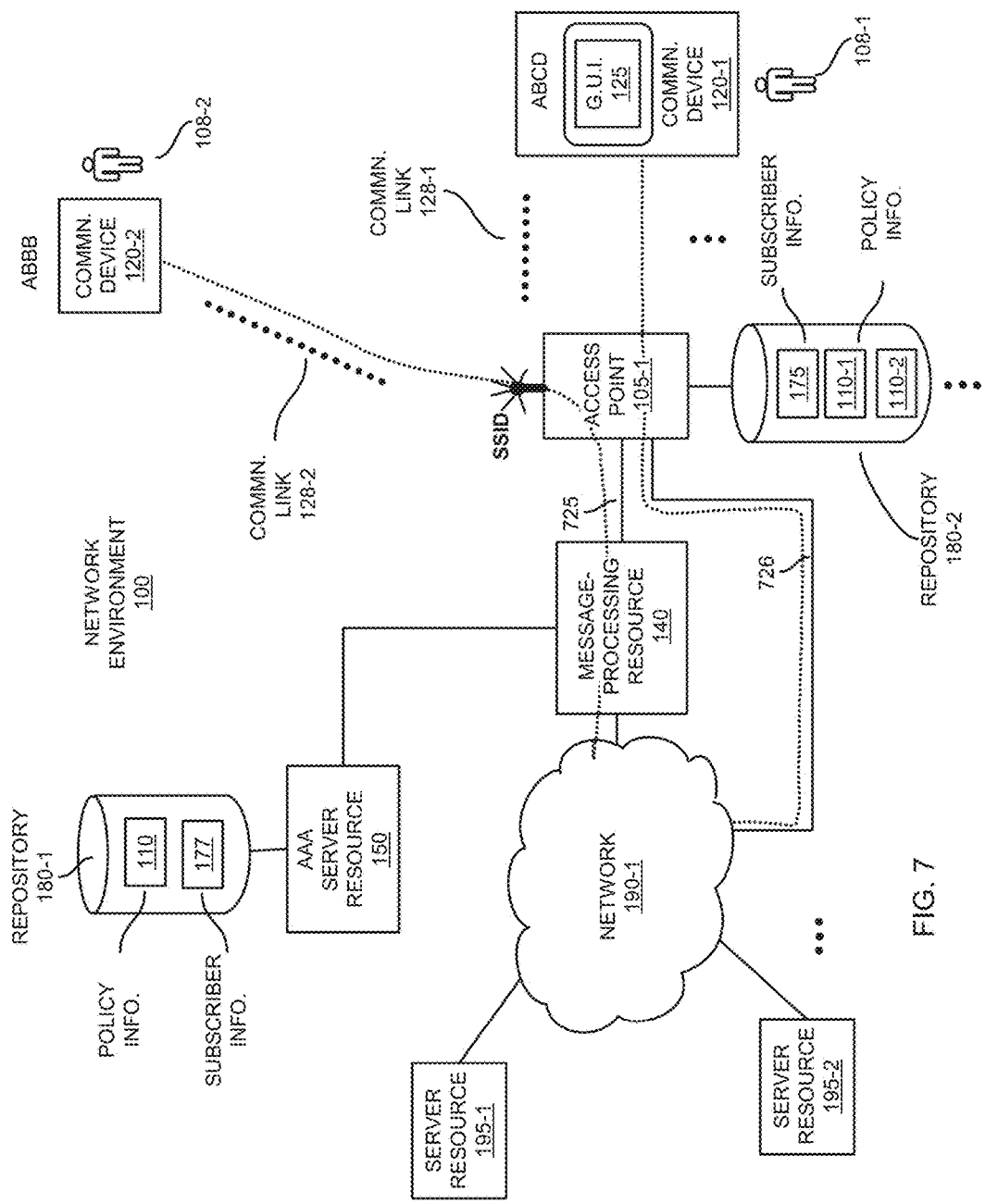
FIG. 7 is an example diagram illustrating a network environment and corresponding control of data through an access point in accordance with one or more policies according to embodiments herein.

FIG. 7 is an example diagram illustrating a bypass technique according to embodiments herein.

In this example embodiment, the wireless access point 105-1 provides connectivity to a single network 190-1 such as the Internet, local area network, etc.

Assume in this example that an operator (such as user 108-2) of the communication device 120-2 subscribes to a network access plan provided by a service provider (such as a cable network service provider that provides wireless access at multiple WiFi™ hotspots as part of a data service plan). Via message processing resource 140, the service provider controls access to server resources in network 190-1 such as server resource 195-1, server resource 195-2, etc.

Assume further in this example that the user 108-1 wishes to access a respective network 190-1 but does not subscribe to a corresponding network service provided by the service provider. In accordance with embodiments herein, the access point 105-1 (such as a communication manager function in the access point 105-1) can be configured to provide user 108-1 operating mobile communication device 120-1 access to network 190-1 in a manner as previously discussed.

Assume that the policy 110-1 indicates to forward any communications from communication device 120-1 directly to network 190-1, bypassing the message-processing resource 140. In such an instance, when the access point 105-1 receives communications from communication device 120-1, in accordance with routing information as specified by policy 110-1 assigned to the first mobile communication device 120-1, the wireless access point 105-1 transmits data traffic received from the first mobile communication device 120-2 over link 726 and network 190-1 to an appropriate destination as specified by the communication device 120-1.

Assume that the policy 110-2 indicates to forward any communications from communication device 120-2 directly to message-processing resource 140. In such an instance, when the access point 105-1 receives communications from communication device 120-2, in accordance with routing information as specified by policy 110-2 assigned to the mobile communication device 120-2, the wireless access point 105-1 transmits data traffic received from the mobile communication device 120-2 over link 725 (such as a link supporting tunneled routing) communications to message-processing resource 140. The message-processing resource 140 initiates transmission of the communication (data traffic received from the medication device 120-2) over network 190-1 to the appropriate destination address.

Thus, wireless access point 105-1 can be configured to provide certain users direct access to network 190-1 (such as without tunneled routing) while providing other users access to network 190-1 (such as with tunneled routing) through message-processing resource 140. In certain instances, the users (such as user 108-2) communicating through message-processing resource 140 are able to retrieve different content than users (such as user 108-1) that are provided direct connectivity to network 190-1.

Figure 8:
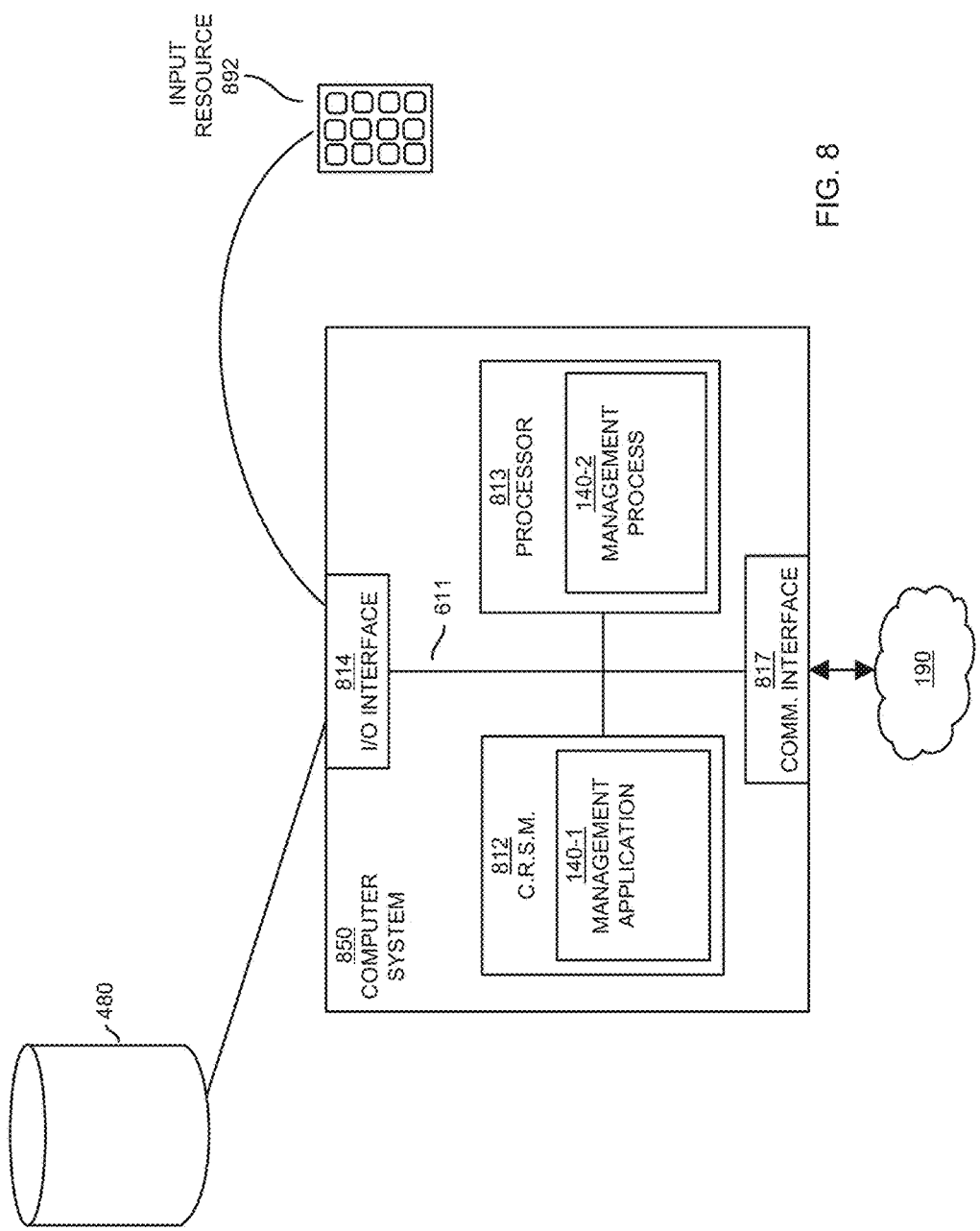
FIG. 8 is an example diagram illustrating a computer system to carry out operations according to embodiments herein.

FIG. 8 is a diagram illustrating an example computer architecture in which to execute any of the functionality according to embodiments herein. Any of the different processing techniques can be implemented via execution of software code on computer processor hardware.

For example, as shown, computer system 850 (e.g., computer processor hardware) of the present example can include an interconnect 811 that couples computer readable storage media 812 such as a non-transitory type of media (i.e., any type of hardware storage medium) in which digital information can be stored and retrieved. The computer system 850 can further include processor 813 (i.e., computer processor hardware such as one or more processor co-located or disparately located processor devices), I/O interface 814, communications interface 817, etc.

Computer system 850 can be located at any suitable locations in network environment 100 to carry out the operations as discussed herein. Computer processor hardware (i.e., processor 813) and/or computer system 850 can be located in a single location or can be distributed amongst multiple locations.

As its name suggests, I/O interface 814 provides connectivity to resources such as repository 480, control devices (such as controller 792), one or more display screens, etc.

Computer readable storage medium 812 can be any hardware storage device to store data such as memory, optical storage, hard drive, floppy disk, etc. In one embodiment, the computer readable storage medium 812 stores instructions and/or data.

Communications interface 817 enables the computer system 850 and processor resource 813 to communicate over a resource such as any of networks 190. I/O interface 814 enables processor resource 813 to access data from a local or remote location, control a respective display screen, receive input, etc.

As shown, computer readable storage media 812 can be encoded with management application 140-1 (e.g., software, firmware, etc.) executed by processor 813. Management application 140-1 can be configured to include instructions to implement any of the operations as discussed herein associated with message-processing resource 140, remote server 150, mobile communication devices 120, wireless access points 105, etc.

During operation of one embodiment, processor 813 accesses computer readable storage media 812 via the use of interconnect 811 in order to launch, run, execute, interpret or otherwise perform the instructions in management application 140-1 stored on computer readable storage medium 812.

Execution of the management application 140-1 produces processing functionality such as management process 140-2 in processor resource 813. In other words, the management process 140-2 associated with processor resource 813 represents one or more aspects of executing management application 140-1 within or upon the processor resource 813 in the computer system 850.

Those skilled in the art will understand that the computer system 850 can include other processes and/or software and hardware components, such as an operating system that controls allocation and use of hardware resources to execute management application 140-1.

In accordance with different embodiments, note that computer system may be any of various types of devices, including, but not limited to, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 850 may reside at any location or multiple locations in network environment 100. The computer system 850 can be included in any suitable resource in network environment 100 to implement functionality as discussed herein.

Note that each of the other functions as discussed herein can be executed in a respective computer system based on execution of corresponding instructions. For example, communication device can include respective computer readable storage medium and processor hardware to execute the operations performed by communication device 110-1.

Functionality supported by the different resources will now be discussed via flowcharts in FIGS. 9 and 10. Note that the steps in the flowcharts below can be executed in any suitable order.

Figure 9:
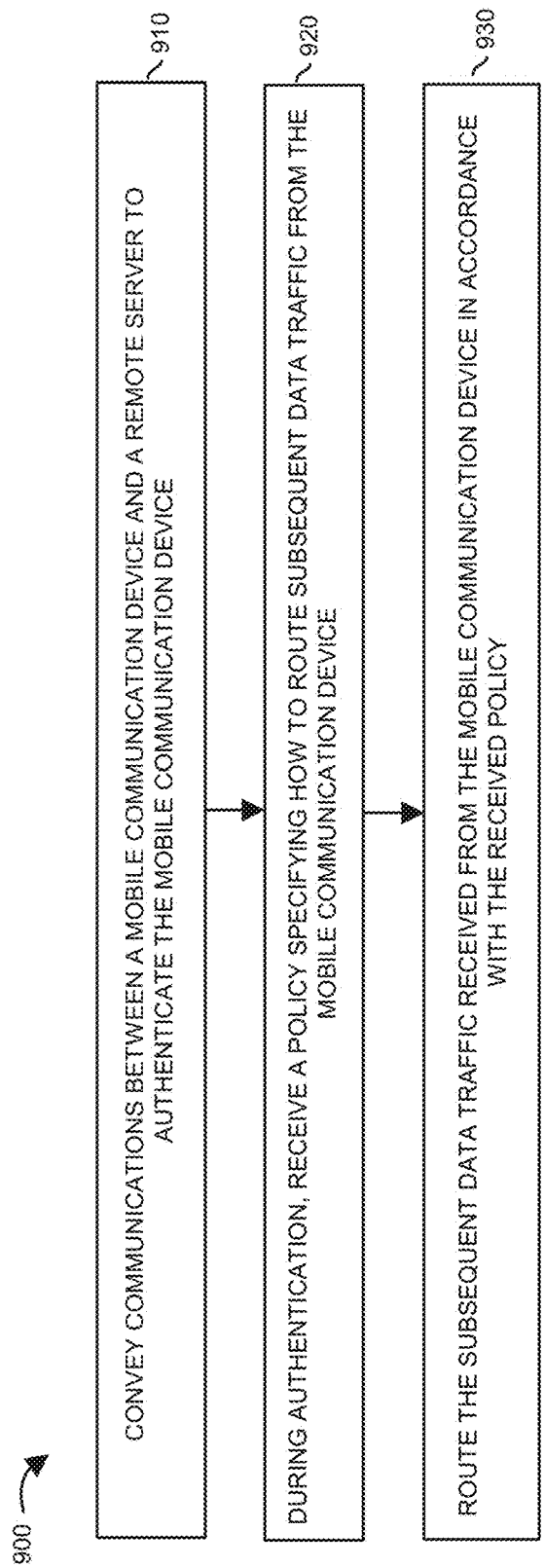
FIG. 9 is an example diagram illustrating a method according to embodiments herein.

FIG. 9 is a flowchart 900 illustrating an example method according to embodiments. Note that there will be some overlap with respect to concepts as discussed above.

In processing block 910, the message processor conveys communications between a mobile communication device and a remote server 150 to authenticate the mobile communication device.

In processing block 920, during authentication, the message processor receives a policy (assigned to the mobile communication device) specifying how to route subsequent data traffic from the mobile communication device.

In processing block 930, the message processor routes the subsequent data traffic received from the mobile communication device in accordance with the received policy.

Figure 10:
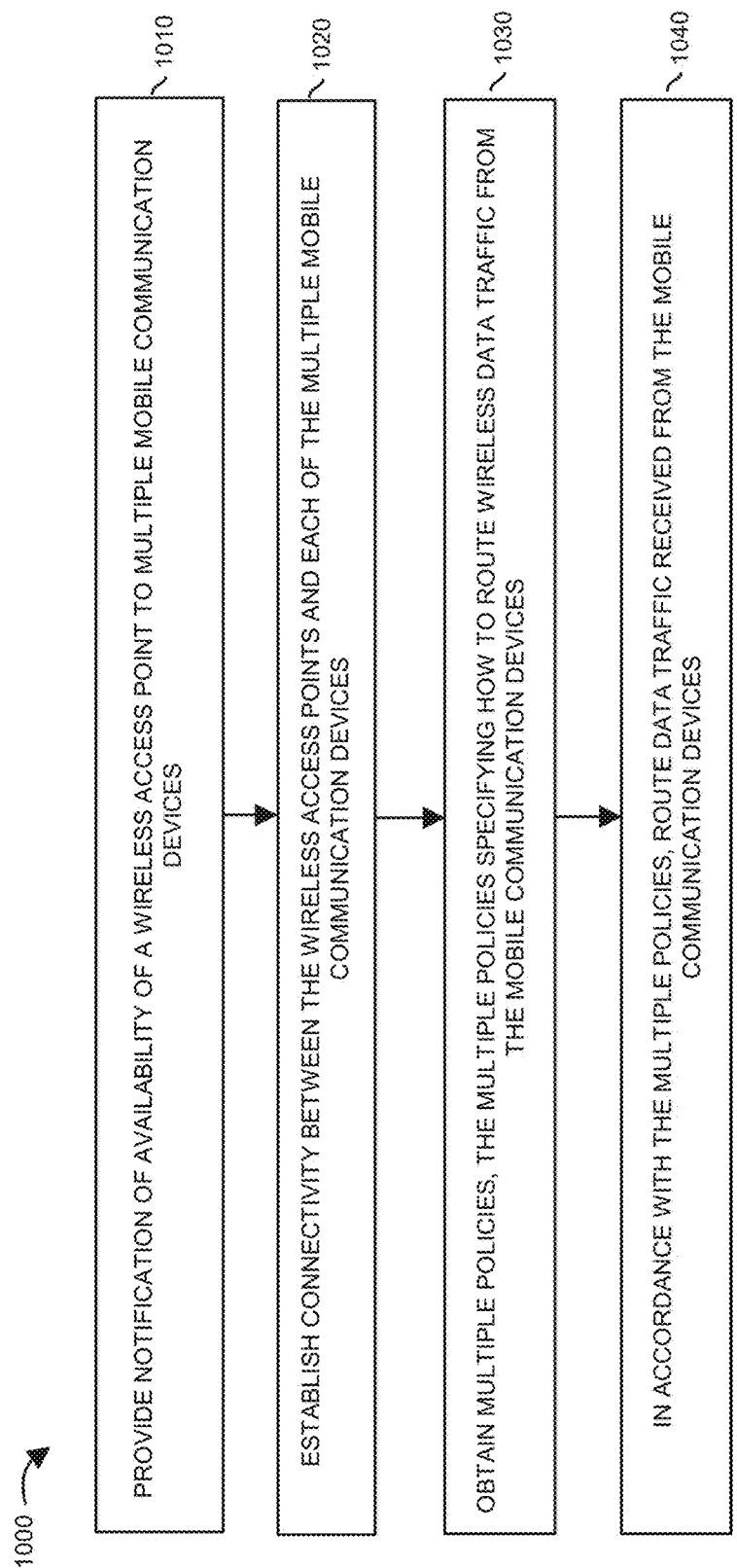
FIG. 10 is an example diagram illustrating a method according to embodiments herein.

FIG. 10 is a flowchart 1000 illustrating an example method according to embodiments. Note that there will be some overlap with respect to concepts as discussed above.

In processing block 1010, the message processor initiates providing notification of availability of a wireless access point to multiple mobile communication devices.

In processing block 1020, the message processor establishes connectivity between the wireless access point and each of the multiple mobile communication devices.

In processing block 1030, the message processor obtains multiple policies; the multiple policies specify how to route wireless data traffic from the mobile communication devices.

In processing block 1040, in accordance with the multiple policies, the message processor routes data traffic received from the mobile communication devices over networks 190.

Note again that techniques herein are well suited for distribution of policy information as well as use of the policy information to control handling of communications at one or more wireless access points. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
via message processing hardware associated with a wireless access point that selectively provides access to multiple different networks including a first network and a second network, performing operations of:
establishing a wireless communication link between the wireless access point and a mobile communication device, the wireless access point coupled to communicate with the multiple different networks;
retrieving a policy assigned to the mobile communication device during authentication of the mobile communication device to use the wireless access point, the policy specifying how to route subsequent data traffic received from the mobile communication device, the policy indicating that the mobile communication device is authorized use of the first network of the multiple different networks; and
routing the subsequent data traffic received from the mobile communication device over the first network in accordance with the policy assigned to the mobile communication device;
wherein the wireless access point includes a first physical port connecting the wireless access point over a first communication path to the first wireless network;
wherein the wireless access point includes a second physical port connecting the wireless access point over a second communication path to the second wireless network; and
wherein routing the subsequent data traffic received from the mobile communication device over the first network in accordance with the policy assigned to the mobile communication device includes: in response to detecting that the policy indicates to forward data traffic from the mobile communication device over the first network, transmitting the subsequent data traffic through the first physical port to the first network in lieu of transmitting the subsequent data traffic through the second physical port.

2. The method as in claim 1, wherein the mobile communication device is a first mobile communication device amongst multiple mobile communication devices in wireless communication with the wireless access point, the wireless access point providing the multiple mobile communication devices access to the multiple different networks; and
wherein each of the mobile communication devices including the first mobile communication device and a second mobile communication device uses a same SSID to access the multiple different networks.

3. The method as in claim 1 further comprising:
during the authentication, forwarding an identity of the mobile communication device from the wireless access point to a remote authentication server;
forwarding a challenge received from the remote authentication server to the mobile communication device, the challenge requesting credentials from the mobile communication device;

forwarding a challenge response received from the mobile communication device to the authentication server, the challenge response including the requested credentials provided by the mobile communication device; and receiving an acknowledgment from the authentication server indicating that the authentication server verified that the challenge response received from the mobile communication device is correct and that the mobile communication device has been authenticated and is authorized to use the wireless access point to access the multiple different networks.

4. The method as in claim 3, wherein forwarding the identity of the mobile communication device includes forwarding the identity of the mobile communication device through a remote gateway resource, the remote gateway resource providing access to a first network of the multiple different networks; and wherein forwarding the challenge response received from the mobile communication device to the authentication server includes forwarding the challenge response through the remote gateway resource to the authentication server.

5. The method as in claim 4 further comprising:
in response to receiving the acknowledgment, providing the mobile communication device access to the first network via communications through the remote gateway resource.

6. The method as in claim 1, wherein the subsequent data traffic includes a communication transmitted from the mobile communication device to a particular destination; and wherein the routing of the subsequent data traffic includes transmitting the communication over the first network to the particular destination.

7. The method as in claim 1, wherein the first communication path is a bypass communication path with respect to the second communication path.

8. The method as in claim 1, wherein the second network provides access to different content than the first network.

9. The method as in claim 1, wherein the second network provides access to different content than the first network.

10. The method as in claim 1, wherein the mobile communication device is a first mobile communication device, the method further comprising:

providing tunneled routing of the subsequent data traffic to the first network through the first physical port of the wireless access point; and in accordance with a policy assigned to a second mobile communication device, providing non-tunneled routing of communications from the second mobile communication device to the second network through the second physical port of the wireless access point.

11. The method as in claim 10, wherein the first physical port is a bypass communication path with respect to the second physical port.

12. The method as in claim 1, wherein the wireless access point transmits the subsequent data to the first network based on an intended first specified destination as indicated by a destination address of the subsequent data traffic.

13. The method as in claim 12, wherein the subsequent data traffic is first data traffic transmitted from the mobile communication device to the wireless access point, the method further comprising:

receiving second data traffic from the mobile communication device, the second data traffic indicating an intended second recipient as indicated by a destination address in the second data traffic; and in accordance with the policy, transmitting the second data traffic to the second network based on the intended second recipient as indicated by the destination address of the second data traffic.

14. A method comprising:
via message processing hardware associated with a wireless access point that selectively provides access to multiple different networks including a first network and a second network, performing operations of:

establishing a wireless communication link between the wireless access point and a mobile communication device, the wireless access point coupled to communicate with the multiple different networks;

retrieving a policy assigned to the mobile communication device during authentication of the mobile communication device to use the wireless access point, the policy specifying how to route subsequent data traffic received from the mobile communication device, the policy indicating that the mobile communication device is authorized use of the first network of the multiple different networks; and routing the subsequent data traffic received from the mobile communication device over the first network in accordance with the policy assigned to the mobile communication device;

the method further comprising:
identifying a network address assigned to the mobile communication device; and associating the network address of the mobile communication device to the policy; and wherein routing the subsequent data traffic includes: i) detecting presence of the network address in the subsequent data traffic received from the mobile communication device; and ii) mapping the detected network address to the policy assigned to the mobile communication device, the policy indicating to transmit the subsequent data traffic over a bypass path to the first network, the bypass path bypassing a gateway resource.

15. A method comprising:
via message processing hardware associated with a wireless access point that selectively provides access to multiple different networks, performing operations of:

establishing a wireless communication link between the wireless access point and a mobile communication device;

retrieving a policy assigned to the mobile communication device during authentication of the mobile communication device to use the wireless access point, the policy specifying how to route subsequent data traffic received from the mobile communication device;

routing the subsequent data traffic received from the mobile communication device in accordance with the policy assigned to the mobile communication device; and in accordance with the retrieved policy, bypassing a gateway resource via transmission of the subsequent data traffic over a second network, the bypassing being an alternative to conveying the subsequent data traffic through a remote gateway resource to a first network.

16. The method as in claim 15, wherein the wireless access point provides multiple mobile communication devices access to multiple different networks including the first network and the second network.

17. The method as in claim 16, wherein the wireless access point is operable to communicate the subsequent data traffic to the first network through a remote gateway resource, the method further comprising:
 prior to routing the subsequent data traffic, performing the authentication of the mobile communication device via communications from the wireless access point through the remote gateway resource.

18. A system comprising:
 computer processor hardware; and
 a hardware storage resource coupled to communicate with the computer processor hardware, the hardware storage resource storing instructions that, when executed by the computer processor hardware, cause the computer processor hardware to:
  establish a wireless communication link between a wireless access point and a mobile communication device, the wireless access point coupled to communicate with multiple different networks;
  retrieve a policy assigned to the mobile communication device during authentication of the mobile communication device to use the wireless access point, the policy specifying how to route subsequent data traffic received from the mobile communication device, the policy indicating that the mobile communication device is assigned use of the first network of the multiple different networks; and
  route the subsequent data traffic received from the mobile communication device over the first network in accordance with the policy assigned to the mobile communication device;
  wherein execution of the instructions further cause the computer processor hardware to: in accordance with the retrieved policy, bypass a gateway resource via transmission of the subsequent data traffic over a second network, the bypassing being an alternative to conveying the subsequent data traffic through a remote gateway resource to a first network.

19. The system as in claim 18, wherein execution of the instructions further cause the computer processor hardware to:
 identify a network address assigned to the mobile communication device; and
 associate the network address of the mobile communication device to the policy.

20. The system as in claim 19, wherein execution of the instructions further cause the computer processor hardware to:
 detect presence of the network address in the subsequent data traffic received from the mobile communication device; and
 map the detected network address to the policy assigned to the mobile communication device, the policy indicating to transmit the subsequent data traffic over a bypass path other than through a gateway resource.

21. The system as in claim 18, wherein the wireless access point provides multiple mobile communication devices access to multiple different networks including the first network and the second network.

* * * * *